US00RE36640E

United States Patent [19]

Frost et al.

[11] E Patent Number: Re. 36,640

[45] Reissued Date of Patent: Apr. 4, 2000

[54] COLLAPSIBLE CHRISTMAS TREE STAND

[75] Inventors: David Frost; Matthew Leung, both of Long Beach, Calif.

[73] Assignee: Lincoln Imports Ltd., Inc., Placentia, Calif.

[21] Appl. No.: 08/606,767

[22] Filed: Feb. 27, 1996

Related U.S. Patent Documents

Reissue of:

[64] Patent No.: 5,290,004
Issued: Mar. 1, 1994
Appl. No.: 08/071,927
Filed: Jun. 3, 1993

U.S. Applications:

[63] Continuation of application No. 08/015,542, Feb. 9, 1993, abandoned.

[51] Int. Cl.[7] ..... F16M 11/00

[52] U.S. Cl. ..... 248/528; 248/188.7; 47/40.5

[58] Field of Search ..... 248/166, 167, 248/436, 188.6, 188.7, 519, 523, 528, 529

[56] References Cited

U.S. PATENT DOCUMENTS

| | | | |
|---|---|---|---|
| D. 342,694 | 12/1993 | Frost . | |
| 781,552 | 1/1905 | Riek . | |
| 830,671 | 9/1906 | Neff . | |
| 1,289,219 | 12/1918 | Marsh . | |
| 1,559,563 | 11/1925 | Edmister . | |
| 1,575,488 | 3/1926 | Jakobey . | |
| 1,715,603 | 6/1929 | Kamman . | |
| 1,912,054 | 5/1933 | Wright . | |
| 1,943,269 | 6/1934 | Holden . | |
| 2,500,215 | 3/1950 | Swearingen . | |
| 2,531,690 | 11/1950 | Kennel . | |
| 2,625,352 | 1/1953 | Sykes et al. . | |
| 2,670,163 | 2/1954 | Armitage . | |
| 2,681,780 | 6/1954 | Santoro . | |
| 2,699,308 | 1/1955 | Shackelford . | |
| 2,706,609 | 4/1955 | Sullivan | 248/167 |
| 2,786,641 | 3/1957 | Applegate . | |
| 2,875,968 | 3/1959 | Ekola . | |
| 2,908,461 | 10/1959 | Coffeen . | |
| 3,073,558 | 1/1963 | Klotz . | |
| 3,387,808 | 6/1968 | Metcalf . | |
| 3,526,380 | 9/1970 | Tong . | |
| 3,559,942 | 2/1971 | Lucasey | 248/188.6 X |
| 3,715,095 | 2/1973 | Drablowski . | |
| 3,787,018 | 1/1974 | Nathan . | |
| 3,838,838 | 10/1974 | Seaman, Jr. . | |
| 4,223,860 | 9/1980 | Prest | 248/188.6 X |
| 4,288,052 | 9/1981 | Scott . | |
| 4,406,437 | 9/1983 | Wright . | |
| 4,454,859 | 6/1984 | Vincent | 248/188.6 X |
| 4,763,866 | 8/1988 | Sinchok . | |
| 5,022,620 | 6/1991 | Scott . | |
| 5,074,514 | 12/1991 | Smith . | |
| 5,236,167 | 8/1993 | Tai et al. . | |
| 5,301,462 | 4/1994 | Hronyetz . | |
| 5,333,828 | 8/1994 | Severeid | 248/528 X |

*Primary Examiner*—Derek J. Berger
*Attorney, Agent, or Firm*—Conley, Rose & Tayon, P.C.

[57] ABSTRACT

A collapsible Christmas tree stand is disclosed for supporting a Christmas tree or the like from a longitudinal tube supported by two pair of opposing legs. The second pair of legs being rotatable about the tube in relation to a first pair of legs between a storage position and a plurality of support positions. The position of the two pair of legs with respect to one another is maintained with a locking wing nut.

34 Claims, 2 Drawing Sheets

FIG. 4
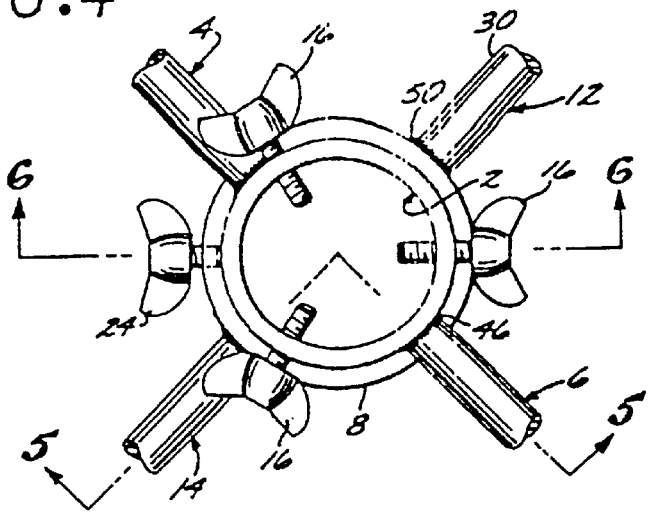
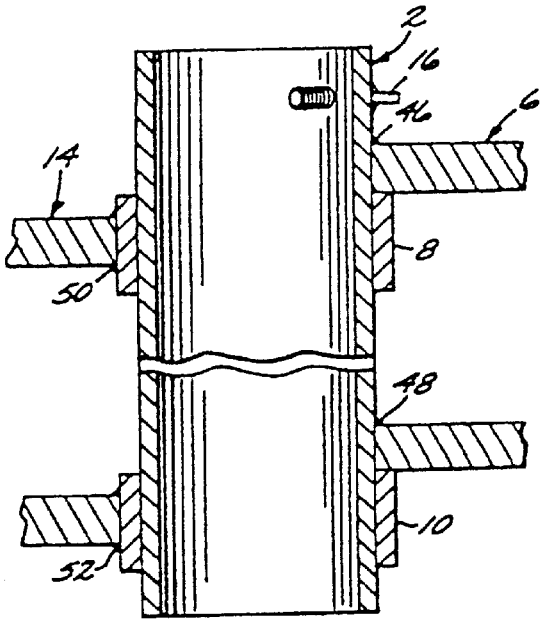
FIG. 5
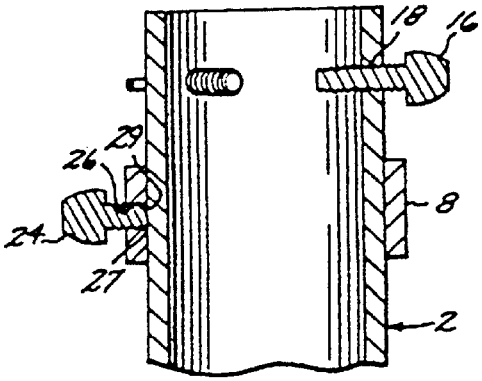
FIG. 6
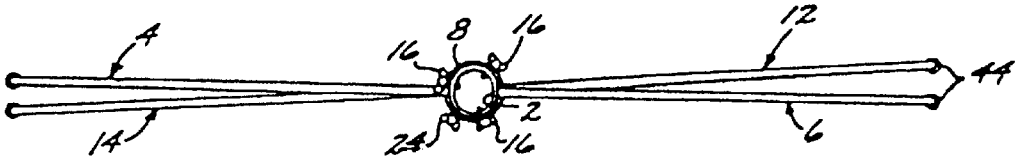
FIG. 7

COLLAPSIBLE CHRISTMAS TREE STAND

Matter enclosed in heavy brackets [ ] appears in the original patent but forms no part of this reissue specification; matter printed in italics indicates the additions made by reissue.

This is a continuation of copending application Ser. No. 08/015,542 filed on Feb. 4, 1993, now abandoned.

FIELD OF THE INVENTION

This invention relates to a collapsible stand for vertically supporting a pole decorated for display and more particularly to a collapsible stabilized support stand for supporting a Christmas tree.

BACKGROUND OF THE INVENTION

Various collapsible tree stands for vertically supporting a Christmas tree or artificial tree pole have been known in the art for a number of years, and by way of example, several forms of such devices can be found in U.S. Pat. Nos. 830,671, 3,387,808 and 4,763,866. Because these devices relate to seasonal decorations, such is a Christmas tree, and are normally utilized during a brief period of the year, such devices generally spend most of the time in storage and construction of such devices to be collapsible ensures the most efficient storage space. Such prior stands, typically comprising four legs, may be adjusted from a position convenient for storage to a position which will support a Christmas tree by altering the angular displacement of the legs in relation to each other. Furthermore, such stands frequently have included locking mechanisms for maintaining the legs in the supporting position while in use.

Prior tree stands which were adjustable between a support position and a storage position have positioned the support legs at equidistant angular displacement with respect to each other. While a support position wherein the legs are maintained at equidistant spacing may be appropriate for the stable support of a tree stand on a latitudinally level surface with a generally large surface area and for a symmetrically balanced tree, the positioning of the legs at other than equidistant spacing is necessary where the asymmetry of the tree or a configuration of the surface of the display location causes uneven weight distribution. The asymmetry of the tree may be due to the natural growth of a harvested tree or in the case of either an artificial or harvested tree the uneven allocation of lights and decorations. Also, other than equidistant spacing of the legs may be necessary where the surface area is limited in one direction. In homes, especially older homes, settling may occur which may cause slopes or indentations, to appear in the floor or display location. Further, in the commercial setting display locations are arranged to create an eye-catching effect to market the selected goods or services to a customer, typically sloping the display surface toward the viewer or limiting surface area for supporting the tree. A tree used in the display to complete the eye-catching visual effect must be capable of stable support under such conditions. Thus, the need exists for a rugged collapsible tree stand which provides for a simple set up and a stable Christmas tree in the situations described herein and having a simple construction that can be manufactured at a low cost.

SUMMARY OF THE INVENTION

The subject invention provides a tree stand construction which comprises a stable support for a Christmas tree requiring a minimal level of cost for construction and which selectively may lock the position of opposing pairs of legs with respect to each other and with respect to a centrally positioned support cylinder. The position of the opposing pairs of legs is adjustable between a configuration suitable for storage of the stand and as a configuration suitable for providing stable support for a Christmas tree.

The subject invention also provides a stabilized tree stand wherein opposing pairs of legs may also be adjusted within a range of positions suitable for stable support of a Christmas tree having uneven lateral weight distribution across the stand or limited surface area for supporting the tree. The range of positions comprise a change in the angular displacement of the opposing pairs of legs. The position of the legs is selectively adjustable to establish a stable stand for supporting a Christmas tree having a laterally unbalanced weight distribution.

Other features and objects of the invention will become apparent from the following detailed description, taken in conjunction with the accompanying drawings, which illustrate, by way of example, the features of the invention.

BRIEF DESCRIPTION OF THE DRAWINGS

FIG. 4 is a top view of the center portion of the subject invention as identified by Circle 4 in FIG. 1.

FIG. 5 is a cross-sectional side view of the subject invention taken along line 5—5 in FIG. 4;

FIG. 6 is a partial cross-sectional side view of the subject invention taken along line 6—6 in FIG. 4;

FIG. 7 is a top view of the subject invention showing the legs positioned in a manner suitable for storage.

DETAILED DESCRIPTION

Figure 1:
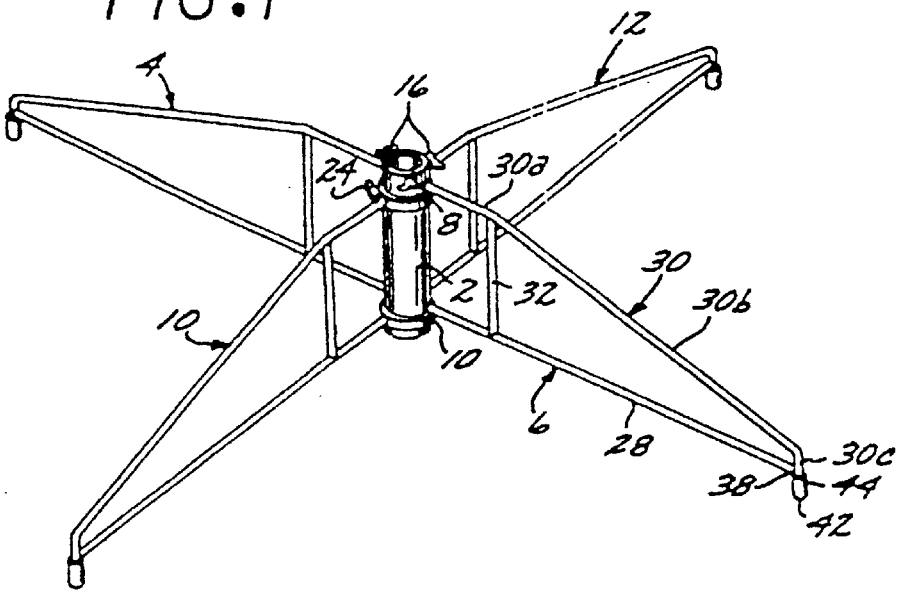
FIG. 1 is a perspective view of the subject invention showing the legs positioned in a manner for supporting a longitudinally positioned pole.
Figure 2:
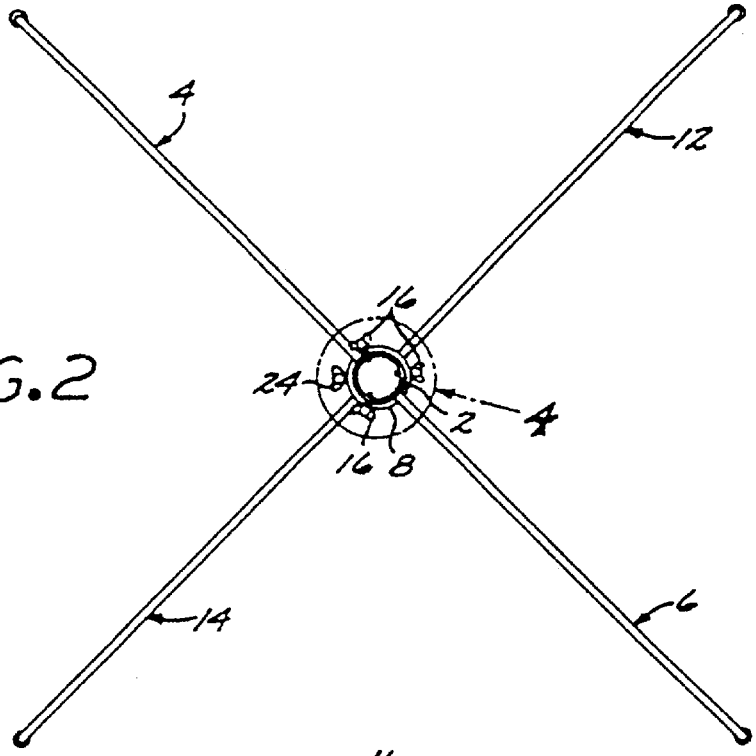
FIG. 2 is a top of the invention shown in FIG. 1.

In general terms, the present invention, as shown in FIG. 1, comprises a cylindrical tube 2 wherein the longitudinal axis of the cylinder 2 is positioned vertically. Connected to the cylinder 2 at upper and lower positions are a first pair of legs 4 and 6 extending radially outward from the longitudinal axis in opposing directions. The angular displacement of opposing leg 4 and 6 is preferably 180°. Two annular rotating collars, upper collar 8 and lower collar 10, are mounted about cylinder 2. A second pair of opposing legs 12 and 14 are connected to the upper collar 8 and lower collar 10 in a 180° angular displacement similar to the first pair of legs 4 and 6. Legs 12 and 14 also extend radially outward from the longitudinal axis of the cylinder 2 in opposing directions. As shown in FIG. 2, when deployed in the preferred support position, the legs 4, 6, 12 and 14 are arranged at 90° with respect to one another in a position that provides stable support for a Christmas tree. The positioning of pairs of legs 4, 6 and 12, 14 is selected according to the lateral distribution of weight of the Christmas tree or surface area available for the support stand. It will be appreciated that varying the positioning of the legs may be used to account for such factors as uneven or sloping support surfaces, limited support surface area, the lateral asymmetry of the Christmas tree, or the uneven arrangement of decorations on the tree.

When the lateral weight distribution of the Christmas tree is balanced and the surface area will permit the arrangement, legs 4, 6, 12 and 14 are arranged at 90° angles with respect to one another as shown in FIG. 2. A plurality of retainers 16 are threaded through threaded apertures 18 (FIG. 6) disposed around the upper portion of the cylinder 2 at equidistant positions along the circumference of the cylinder 2.

A locking device 24 is threaded and extends through a threaded aperture 26 (FIG. 6) in collar 8. The inner end 27 of device 24 adjustably contacts the cylinder 2 at its outer surface 29. In a preferred embodiment locking device 24 is a wing nut.

Figure 3:
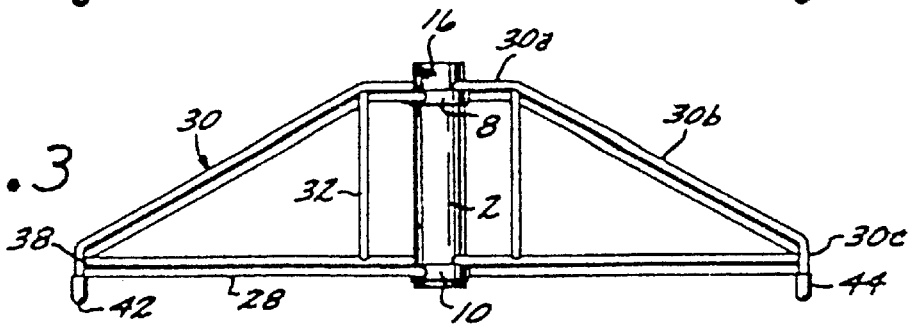
FIG. 3 is a front view of the invention as shown in FIG. 2.

Referring to FIGS. 1 and 3, the legs 4, 6, 12 and 14 each include 3 parts, a lower bar 28, an upper bar 30 and a brace member 32. The lower bar is positioned perpendicularly with respect to the cylinder 2. Upper bar 30 is comprised of three segments. A first segment 30a, located proximate to the cylinder 2, is positioned parallel to the lower bar 28. At an intermediate distance outward from the cylinder 2, the brace member 32 extends between and connects upper bar 30a with the lower bar 28. At the point 31 where the brace member 32 connects to the upper bar 30a, the second segment 30b of the upper bar 30 connects to the first segment 30a and extends downwardly outward from the cylinder 2 toward the lower bar 28. At a point 33 above the distal end 38 of the lower bar 28 the second segment 30b of the upper bar connects to the third segment 30c of the upper bar 30. The third segment 30c of the upper bar 30 connects to and extends beyond the distal end 38 of the lower bar 28. The distal end 42 of the third segment 30c forms a foot or surface contact point for the legs. The foot or surface contact point 42 is preferably enclosed by a cap 44. The cap 44 protects a surface (not shown) from damage which may occur due to direct contact with the surface contact point 42. It will be appreciated that, the arrangement of the leg components in this manner ensures stable lateral support for a Christmas tree. In a preferred embodiment, the segments 30a, b, c of the upper bar 30 are integrally formed from the same bar.

Referring to FIGS. 4–6, the connection of the legs 4, 6, 12 and 14 to the cylinder is shown in detail. First pair of legs 4 and 6 are connected directly to the cylinder 2 at upper 46 and lower 48 contact points. The second pair of legs 12 and 14 are connected to the upper 8 and lower 10 collars of upper and lower contact points, 50 and 52, respectively. The second pair of legs 12 and 14 and collars 8 and 10 are positioned in underlying relationship with the first pair 4 and 6.

Although the collapsible Christmas tree stand may be constructed with any suitable material such as high strength plastic, the preferred embodiment comprises wrought iron components which are attached at the connection points using arc wielding or similar wielding techniques. The retaining elements are preferably metal wing nuts which may be readily obtained from a variety of suppliers; however, any suitable fastening means may be employed. It will be appreciated that any comparable type of construction material may be used to construct this device.

In operation the tree stand legs are positioned so as to place the first pair of legs, 4 and 6, and second pair of legs, 12 and 14, at a selected angular displacement. It will be appreciated that the angular separation of the first and second pair of legs is selected according to the weight distribution requirements of the Christmas tree, the limited surface area available for the stand and to accommodate uneveness in the floor, etc. The Christmas tree trunk (not shown) is contained within the cylinder 2 by the retainers 16. The locking wing nut 24 for the second pair of legs is rotated to frictionally engage the cylinder and lock legs 12 and 14 in position providing stability to the tree stand.

While the preferred embodiment is for an artificial Christmas tree, it will be appreciated that the subject invention may be used in supporting a harvested living Christmas tree by closing the bottom end 2b of cylinder 2 so that it retains fluid. Additionally, a fluid enclosure (not shown) may be attached or coupled to legs 12 and 14 and positioned beneath cylinder 2. It must also be recognized that the subject invention may be utilized in connection with items other than Christmas trees, such as flag poles, etc.

While a particular form of the invention has been illustrated and described, it will be apparent the various modifications can be made without departing from the spirit and scope of the invention.

What is claimed is:

1. A stand for vertically supporting an object comprising;

a cylindrical tube, one end of said tube adapted for receiving an object;

a first pair of support legs connected to the exterior surface of said tube, said first pair of support legs extending radially outward from the longitudinal axis of said tube;

upper and lower annular collars rotatably coupled about said tube;

a second pair of support legs connected to said upper and lower collars, said second pair of support legs extending radially outward from the longitudinal axis of said tube;

means for retaining an object within said tube, said retaining means projecting radially through the tube toward said longitudinal axis;

a locking means adjustably positioned through the upper collar, said locking means projecting radially toward the longitudinal axis of the tube and selectively positioned in contact with the tube;

wherein said second pair of legs is rotatable with respect to said first pair of legs between a first position to a plurality of second positions.

2. The support stand of claim 1 wherein each of said legs of said first and second pair of legs includes a support member connected at the distal end of said legs.

3. The support stand of claim 1 wherein the legs of said first and second pair of legs further comprise:

an upper bar;

a lower bar; and a brace member.

4. The support stand of claim 1 wherein said upper annular collar is interposed between said first pair of support legs and said receiving end of said tube.

5. The support stand of claim 1 wherein said first pair of support legs is interposed between said lower annular collar and said receiving end of said tube.

6. The support stand of claim 3 wherein said upper bar of said first pair of legs is interposed between said receiving end of said tube and said upper annular collar.

7. The support stand of claim 3 wherein said lower annular collar is interposed between said receiving end of said tube and said lower bar of said first pair of legs.

8. The support stand of claim 1 wherein said retaining means is disposed proximate to said receiving end of said tube.

9. The support stand of claim 1 wherein said retaining means comprise wing [nuts] *bolts*.

10. The support stand of claim 3 wherein said upper bar further comprises three segments; said third segment being said support member.

11. A support stand comprising;

a cylindrical tube;

a first pair of support legs connected to the exterior surface of said tube, said first pair of support legs extending radially outward from the longitudinal axis of said tube;

upper and lower annular collars rotatably coupled about said tube;

a second pair of support legs connected to said upper and lower collars, said second pair of support legs extending radially outward from the longitudinal axis of said tube;

said legs of said first and second pair of legs including an upper bar, a lower bar, and a brace member.

means for retaining an object within said tube, said retaining means projecting radially through the tube toward said longitudinal axis;

a locking means adjustably positioned through the upper collar, said locking means projecting radially toward the longitudinal axis of the tube and selectively positioned in contact with the tube;

wherein said second pair of legs are rotatable with respect to said first pair of legs between a first position and a plurality of second positions to support said tube;

said legs of each of the first and second pair of legs having a radially distal support member.

12. The support stand of claim 1 wherein the legs of said first and second pair of legs further comprise:

an upper bar;

a lower bar; and a brace member.

13. The support stand of claim 11 wherein said upper annular collar is interposed between said first pair of support legs and said receiving end of said tube.

14. The support stand of claim 11 wherein said first pair of support legs is interposed between said receiving end of said tube and said lower annular collar.

15. The support stand of claim 12 wherein said upper bar of said first pair of legs is interposed between said receiving end of said tube and said upper annular collar.

16. The support stand of claim 12 wherein said lower annular collar is interposed between said receiving end of said tube and said lower bar of said first pair of legs.

17. The support stand of claim 11 wherein said retaining means is disposed proximate to said receiving end of said tube.

18. The support stand of claim 11 wherein said retaining means comprise wing [nuts] *bolts*.

19. The support stand of claim 11 wherein said upper bar further comprises three segments with said third segment being said support member.

*20. A stand for vertically supporting an object comprising:*

*a cylindrical tube for vertically supporting the object, one end of said tube adapted for receiving the object;*

*a first pair of support legs connected to the exterior surface of said tube, said first pair of support legs extending outward from said tube;*

*at least one annular collar rotatably mounted around said tube;*

*a second pair of support legs connected to said annular collar, said second pair of support legs extending outward from said tube;*

*a lock for locking the annular collar with respect to the tube;*

*said first pair of legs being rotatable with respect to the other pair of legs between a first position and a plurality of second positions; and*

*upon locking, said lock preventing said annular collar from axial and rotational movement about said tube in said first and second positions.*

*21. The stand of claim 20 wherein said first and second pairs of support legs extend radially outward from the longitudinal axis of said tube.*

*22. The stand of claim 20 further including a retainer for retaining the object within said tube, said retainer projecting through said tube toward the longitudinal axis of said tube.*

*23. The stand of claim 20 wherein said lock is adjustably positioned on said annular collar for locking said annular collar to said tube while the tube is supporting the object.*

*24. A support stand comprising:*

*a cylindrical tube;*

*a first pair of support legs connected at an upper and a lower location on the exterior surface of said tube, said first pair of support legs extending outward from the longitudinal axis of said tube;*

*at least one cylindrical member having a length and being rotatably mounted around said tube between said upper and lower locations on said tube;*

*a second pair of support legs connected to said cylindrical member, said second pair of support legs extending outward from the longitudinal axis of said tube;*

*said legs of said second pair of support legs having a width which is less than the length of said cylindrical member;*

*a retainer member for retaining an object within said tube;*

*a locking member adjustably positioned on said cylindrical member for positioning said cylindrical member with respect to said tube; and*

*one pair of legs being rotatable with respect to the other pair of legs between a first position and a plurality of second positions to support said tube.*

*25. The stand of claim 24 wherein each of said legs of said first and second pair of legs includes first and second supports having a radially distal support member extending between said supports.*

*26. The stand of claim 24 wherein said locking member projects toward said tube and is selectively positioned in contact with said tube.*

*27. A stand for vertically supporting an object, comprising:*

*a first member adapted for coaxially supporting the object;*

*first legs attached to said first member and extending outward from said first member;*

*a second member rotatably disposed around said first member;*

*second legs attached to said second member and extending outward from said second member;*

*said first and second legs being rotatable with respect to each other; and*

*a lock member for adjustably locking said second legs with respect to said first legs at at least three different positions while the first member is supporting the object.*

*28. The stand of claim 27 wherein said first member has a longitudinal axis and said first and second legs extend radially outward from the longitudinal axis of said first member.*

*29. The stand of claim 27 further including a retainer member on said first member for retaining the object on said first member.*

*30. A stand for vertically supporting an object, comprising:*

*a first cylinder for vertically supporting the object and having one end for receiving the object;*

*the first cylinder having a first pair of support legs extending outwardly from said first cylinder;*

*a second cylinder rotatably received over said first cylinder;*

*the second cylinder having a second pair of support legs;*

*one of said pair of support legs being rotatable with respect to the other of said pair of support legs between a first position with said pairs of legs together and a second position with said pairs of legs apart; and*

*a lock member on said second cylinder for preventing axial movement and rotation of said second cylinder with respect to said first cylinder in said first and second positions.*

*31. The stand of claim 30 wherein said first and second pairs of support legs extend radially outwardly from the longitudinal axis of said first cylinder.*

*32. The stand of claim 30 further including a retainer member disposed on said first cylinder for retaining the object within said first cylinder.*

*33. The stand of claim 30 wherein said first pair of legs extends from said first cylinder at an upper and a lower location and said second cylinder is disposed on said first cylinder between said locations.*

*34. A stand for vertically supporting an object, comprising:*

*a first cylinder for vertically supporting the object and having one end for receiving the object;*

*the first cylinder having a first pair of support legs extending outwardly from said first cylinder;*

*a second cylinder rotatably received over said first cylinder;*

*the second cylinder having a second pair of support legs;*

*a lock member on said second cylinder for preventing rotation of said second cylinder with respect to said first cylinder; and*

*one of said pair of support legs being rotatable with respect to the other of said pair of support legs;*

*said lock member locking said first cylinder and said second cylinder at at least three different positions while said first cylinder is supporting the object.*

* * * * *